(No Model.)
J. WALKER.
NUT LOCK.
No. 587,889. Patented Aug. 10, 1897.
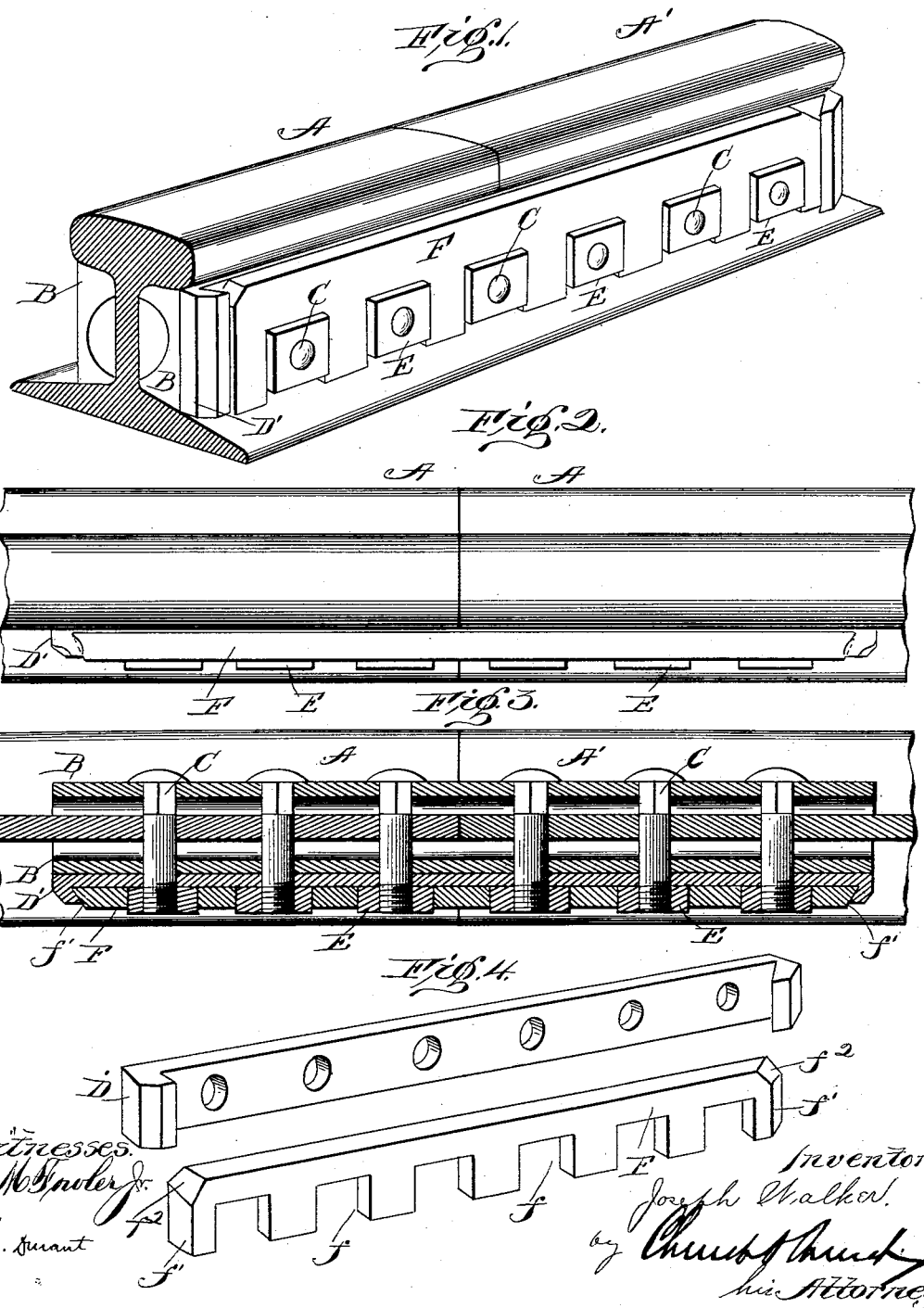

UNITED STATES PATENT OFFICE.

JOSEPH WALKER, OF CLARK'S GREEN, PENNSYLVANIA, ASSIGNOR TO B. C. GREENE, OF SCRANTON, PENNSYLVANIA.

NUT-LOCK.

SPECIFICATION forming part of Letters Patent No. 587,889, dated August 10, 1897.

Application filed December 14, 1896. Serial No. 615,638. (No model.)

*To all whom it may concern:*

Be it known that I, JOSEPH WALKER, of Clark's Green, in the county of Lackawanna, State of Pennsylvania, have invented certain new and useful Improvements in Nut-Locks; and I do hereby declare the following to be a full, clear, and exact description of the same, reference being had to the accompanying drawings, forming a part of this specification, and the letters of reference marked thereon.

This invention relates to improvements in nut-locks especially designed to lock the nuts on the bolts used in securing the fish-plates to the meeting ends of railroad-rails, although equally well adapted for use wherever it is desired to prevent nuts from becoming loose on bolts from constant strain or shock.

The invention consists in certain novel details of construction and combination and arrangements of parts, all as will be now described, and pointed out particularly in the claim at the end of this specification.

In the accompanying drawings, Figure 1 is a perspective view of the meeting ends of two rails with the invention applied thereto. Fig. 2 is a top plan view. Fig. 3 is a horizontal section on the line $x\,x$, Fig. 1. Fig. 4 is a detail view of the washer-plate and lock-plate.

Similar letters of reference in the several figures indicate the same parts.

Referring to the drawings, A A' represent the rails, B the fish-plates for uniting the rails together, and C the bolts for securing the fish-plates to the rails.

D is a washer-plate formed with bolt-holes $d'$, through which the bolts pass, and E are the nuts, screwing on the ends of the bolts, which may be square, as shown, or hexagonal or any desired shape.

The washer-plate is formed with guideways in each end having an inclined wall for the reception of the ends of the lock-plate, these guideways being preferably formed by turning up the ends of the plate, as at D', and bending them over toward the body of the plate, as shown.

The lock-plate F is formed with a series of openings $f$ of a shape to correspond to the shape of the nuts used, in the present instance being square and preferably having one open side, which are adapted to fit over and embrace the nuts to lock them from turning. At each end the lock-plate is beveled or inclined, as shown at $f'$, which inclines cooperate with the inclines in the ends of the washer-plate when the parts are in position to prevent the lock-plates working forward. The upper corners of each end of the lock-plate are cut off or removed, as at $f^2$, whereby the upper portion of the upturned ends of the washer-plate may be hammered down or clenched over the lock-plate to prevent its upward movement, as shown, but which can be readily opened when necessary.

From the above description it will be seen that the device consists of a few parts which can be quickly assembled and which effectually lock the nuts from turning.

Having thus described my invention, what I claim as new is—

In a nut-lock, the combination with the rails and fish-plates, the bolts passing therethrough, the nuts on the bolts, the washer-plates formed with the upturned overhanging ends, the lock-plate having the beveled ends, adapted to be received under the overhanging ends of the washer-plate, said lock-plate also having its upper corners removed, whereby the upper portion of the upturned ends of the washer-plate may be turned down upon the lock-plate to prevent its upward movement; substantially as described.

JOSEPH WALKER.

Witnesses:
J. H. LAINE,
J. M. WALKER.